United States Patent
Arai

(10) Patent No.: US 10,302,519 B2
(45) Date of Patent: May 28, 2019

(54) ROBOT CENTER-OF-GRAVITY DISPLAY DEVICE, ROBOT CONTROL DEVICE, AND ROBOT SIMULATION DEVICE

(71) Applicant: FANUC CORPORATION, Yamanashi (JP)

(72) Inventor: Tomonori Arai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 87 days.

(21) Appl. No.: 15/628,692

(22) Filed: Jun. 21, 2017

(65) Prior Publication Data

US 2018/0017461 A1 Jan. 18, 2018

(30) Foreign Application Priority Data

Jul. 12, 2016 (JP) ................................. 2016-137349

(51) Int. Cl.
*G06F 19/00* (2018.01)
*G01M 1/12* (2006.01)
(Continued)

(52) U.S. Cl.
CPC ........... *G01M 1/122* (2013.01); *B25J 9/1671* (2013.01); *B25J 13/06* (2013.01);
(Continued)

(58) Field of Classification Search
CPC ......... B25J 13/06; G01M 1/122; G05B 19/18; Y10S 901/02; Y10S 901/16; Y10S 901/48
See application file for complete search history.

(56) References Cited

U.S. PATENT DOCUMENTS

| 5,214,749 A * | 5/1993 | Brown ................... B25J 9/1643 700/260 |
| 5,325,467 A | 6/1994 | Torii et al. |

(Continued)

FOREIGN PATENT DOCUMENTS

| EP | 0484551 A1 | 5/1992 |
| EP | 2070662 A1 | 6/2009 |

(Continued)

OTHER PUBLICATIONS

Japanese Office Action dated Apr. 24, 2018 in corresponding Japan Application No. 2016-137349; 9 pgs.
(Continued)

*Primary Examiner* — Harry Y Oh
(74) *Attorney, Agent, or Firm* — Maier & Maier, PLLC

(57) ABSTRACT

Provided is a robot center-of-gravity display device including: a specification setting unit that sets specifications including the weights, center-of-gravity positions, and dimensions of components of respective shafts; a posture setting unit that sets position information of the respective shafts; a robot-image generating unit that generates a three-dimensional model image of the robot in a state where the respective shafts are located at the positions indicated by the position information, based on the set position information of the respective shafts and the specifications of the components; a center-of-gravity-position calculation unit that calculates the center-of-gravity position of the overall robot, based on the set position information of the respective shafts and the specifications of the components; an image combining unit that superimposes an indication showing the center of gravity of the overall robot on the three-dimensional model image at the calculated center-of-gravity position; and a display unit that displays the generated image.

6 Claims, 7 Drawing Sheets

(51) Int. Cl.
*B25J 13/06* (2006.01)
*B25J 9/16* (2006.01)

(52) U.S. Cl.
CPC ... *G05B 2219/39444* (2013.01); *Y10S 901/02* (2013.01); *Y10S 901/16* (2013.01); *Y10S 901/48* (2013.01)

(56) References Cited

U.S. PATENT DOCUMENTS

| | | | |
|---|---|---|---|
| 8,805,584 B2* | 8/2014 | Yamane | B62D 57/032 700/245 |
| 9,393,693 B1* | 7/2016 | Kalakrishnan | B25J 9/1671 |
| 2005/0055131 A1* | 3/2005 | Mikami | B62D 57/02 700/245 |
| 2007/0156283 A1* | 7/2007 | Takenaka | B25J 9/1664 700/245 |
| 2008/0105481 A1* | 5/2008 | Hutcheson | B25J 5/007 180/209 |
| 2009/0234502 A1* | 9/2009 | Ueyama | B25J 9/1697 700/259 |
| 2010/0017028 A1 | 1/2010 | Suga et al. | |
| 2012/0173018 A1* | 7/2012 | Allen | G05D 1/0248 700/245 |
| 2013/0041509 A1* | 2/2013 | Saito | B25J 9/06 700/261 |
| 2015/0190925 A1* | 7/2015 | Hoffman | B25J 9/161 700/257 |
| 2016/0059408 A1* | 3/2016 | Isobe | B25J 5/007 700/253 |

FOREIGN PATENT DOCUMENTS

| | | |
|---|---|---|
| JP | S62-65190 U | 4/1987 |
| JP | H04-30203 A | 2/1992 |
| JP | 10-138187 A | 5/1998 |
| JP | 2001-277158 A | 10/2001 |
| JP | 2003-196323 A | 7/2003 |
| JP | 2008-62330 A | 3/2008 |
| JP | 2008-207331 A | 9/2008 |
| JP | 2016-49616 A | 4/2016 |

OTHER PUBLICATIONS

Search Report dated Apr. 12, 2018 in corresponding Japan Application No. 2016-137349; 13 pgs.

* cited by examiner

FIG. 3

| | | |
|---|---|---|
| ROBOT INSTALLATION ANGLE | ☐ | deg |
| J1 (X) | ☐ | deg (mm) |
| J2 (Y) | ☐ | deg (mm) |
| J3 (Z) | ☐ | deg (mm) |
| J4 (W) | ☐ | deg |
| J5 (P) | ☐ | deg |
| J6 (R) | ☐ | deg |
| LOAD SETTING NUMBER | ☐ | |

CONVERSION ⇩   ⇧ REVERSE-CONVERSION

CENTER-OF-GRAVITY POSITION (X, Y, Z) = (xxxx, xxxx, xxxx)

FIG. 4

| GROUP 1 | | | 1/10 | | GROUP 1 | | | 1/8 |
|---|---|---|---|---|---|---|---|---|
| No. | LOAD WEIGHT [kg] | COMMENT | | | | CONDITION No [ 1 ]: | [HAND] | |
| 1 | 7.80 | [HAND] | | | 2 | LOAD WEIGHT | [kg] | 7.80 |
| 2 | 70.00 | [ ] | | | 3 | CENTER-OF-GRAVITY POSITION OF LOAD X | [cm] | 10.00 |
| 3 | 70.00 | [ ] | | | 4 | CENTER-OF-GRAVITY POSITION OF LOAD Y | [cm] | 0.00 |
| 4 | 70.00 | [ ] | | | 5 | CENTER-OF-GRAVITY POSITION OF LOAD Z | [cm] | 5.00 |
| 5 | 70.00 | [ ] | | | 6 | INERTIA OF LOAD X | [kgfcms^2] | 0.00 |
| 6 | 70.00 | [ ] | | | 7 | INERTIA OF LOAD Y | [kgfcms^2] | 0.00 |
| 7 | 70.00 | [ ] | | | 8 | INERTIA OF LOAD Z | [kgfcms^2] | 0.00 |
| 8 | 70.00 | [ ] | | | | | | |
| 9 | 70.00 | [ ] | | | | | | |
| 10 | 70.00 | [ ] | | | | | | |

SELECTED LOAD SETTING NUMBER = 1

ROBOT CENTER-OF-GRAVITY DISPLAY DEVICE, ROBOT CONTROL DEVICE, AND ROBOT SIMULATION DEVICE

CROSS-REFERENCE TO RELATED APPLICATIONS

This application is based on Japanese Patent Application No. 2016-137349, the content of which is incorporated herein by reference.

TECHNICAL FIELD

The present invention relates to a robot center-of-gravity display device, a robot control device, and a robot simulation device.

BACKGROUND ART

In the related art, there is a known method for automatically calculating the load weight at the leading end of an arm of an articulated robot and the center-of-gravity position thereof without using a force sensor (for example, see PTL 1).

CITATION LIST

Patent Literature

{PTL 1} Japanese Unexamined Patent Application, Publication No. Hei 10-138187

SUMMARY OF INVENTION

The present invention provides the following solutions.

An aspect of the present invention provides a robot center-of-gravity display device including: a specification setting unit that sets the specifications including, at least, the weights, center-of-gravity positions, and dimensions of components of respective shafts of a robot; a posture setting unit that sets position information of the respective shafts of the robot; a robot-image generating unit that generates a three-dimensional model image of the robot in a state in which the respective shafts thereof are located at the positions indicated by the position information on the basis of the position information of the respective shafts of the robot set by the posture setting unit and the specifications of the components set by the specification setting unit; a center-of-gravity-position calculation unit that calculates the center-of-gravity position of the overall robot on the basis of the position information of the respective shafts of the robot set by the posture setting unit and the specifications of the components set by the specification setting unit; an image combining unit that superimposes an indication showing the center of gravity of the overall robot on the three-dimensional model image generated by the robot-image generating unit, at the center-of-gravity position calculated by the center-of-gravity-position calculation unit; and a display unit that displays the image generated by the image combining unit.

Another aspect of the present invention provides a robot control device including any one of the above-described robot center-of-gravity display devices.

Another aspect of the present invention provides a robot simulation device including any one of the above-described robot center-of-gravity display devices.

BRIEF DESCRIPTION OF DRAWINGS

FIG. 3 is a diagram showing an example of an input screen of a posture setting unit of the center-of-gravity display device in FIG. 2.

FIG. 4 is a diagram showing an example of information about the weight and center-of-gravity position of a load, stored in association with a load setting number in FIG. 3.

DESCRIPTION OF EMBODIMENTS

A robot center-of-gravity display device 1 according to an embodiment of the present invention will be described below with reference to the drawings.

The robot center-of-gravity display device 1 according to this embodiment is provided in a robot control device 100.

Figure 1:
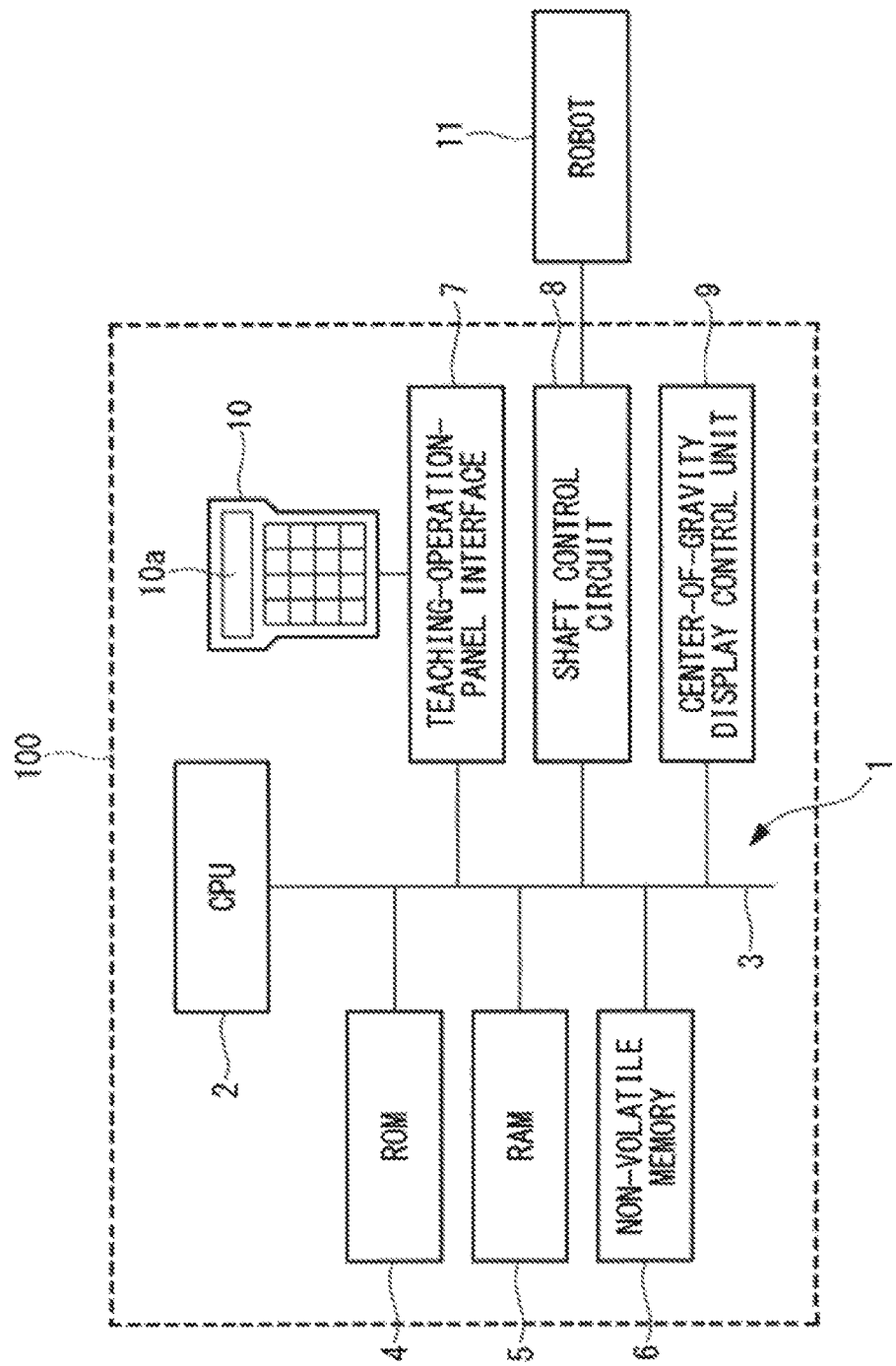
FIG. 1 is a block diagram showing a robot control device including a robot center-of-gravity display device according to an embodiment of the present invention.

As shown in FIG. 1, the robot control device 100 includes a CPU 2, a bus 3 connected to the CPU 2, and a ROM 4, a RAM 5, a non-volatile memory 6, a teaching-operation-panel interface (I/F) 7, a shaft control circuit 8, and a center-of-gravity display control unit 9 that are connected in parallel to the bus 3.

A teaching operation panel 10 is connected to the teaching-operation-panel interface 7. The teaching operation panel 10 has a display function. By manually operating the teaching operation panel 10, an operator generates, corrects, and records an operating program for the robot 11, sets various parameters, reproduces a taught operating program, performs jog feeding, etc.

A system program for supporting the basic functions of the robot 11 and the robot control device 100 is stored in the ROM 4. Furthermore, operating programs for the robot 11 that are taught according to the applications and the associated setting data are stored in the non-volatile memory 6. Data, such as programs for various processing, is also stored in the non-volatile memory 6.

Figure 2:
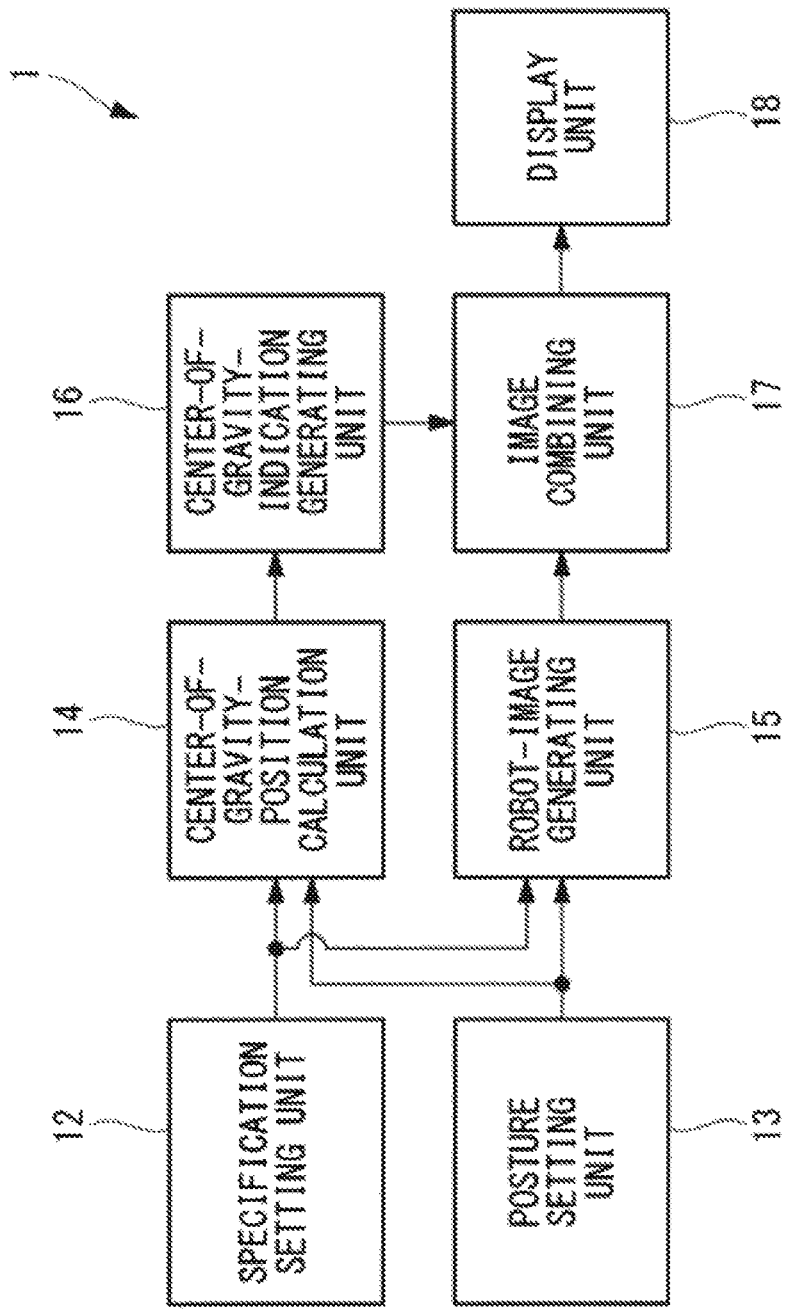
FIG. 2 is a functional block diagram showing the center-of-gravity display device in FIG. 1.

As shown in FIG. 2, the center-of-gravity display device 1 according to this embodiment includes: a specification setting unit 12 that sets the specifications including the weights, center-of-gravity positions, and dimensions of components of the respective shafts of the robot 11; a posture setting unit 13 that sets position information of the respective shafts of the robot 11; a center-of-gravity-position calculation unit 14 that calculates the center-of-gravity position of the overall robot 11; a robot-image generating unit 15 that generates a three-dimensional model image of the robot 11; a center-of-gravity-indication generating unit 16 that generates a center-of-gravity-point indication; an image combining unit 17 that superimposes the center-of-gravity-point indication on the three-dimensional model image; and a display unit 18 that displays the combined image.

The specification setting unit 12 is formed of the non-volatile memory 6 shown in FIG. 1. More specifically, the specifications are set as a result of the data on the length, weight, and center-of-gravity position of the respective link members, serving as the components constituting the respective shafts of the robot 11, being stored in the non-volatile memory 6.

The posture setting unit 13 is formed of the teaching operation panel 10 shown in FIG. 1. More specifically, the posture setting unit 13 sets the position information of the respective shafts by allowing a user to input the angle information of the respective shafts via the teaching operation panel 10. When the posture setting unit 13 allows the user to input the angle information of the respective shafts, for example, it displays an indication as shown in FIG. 3 on a display 10a of the teaching operation panel 10 and allows the user to input the installation angle of the robot 11, the angles of the respective shafts, and the load setting numbers.

The load setting numbers are the numbers allocated to the respective types of workpieces (loads), hands (components), etc. attached to the leading end or the like of the robot 11. As shown in FIG. 4, the load setting numbers are stored in the non-volatile memory 6 so as to be associated with the load weights, center-of-gravity positions, etc., and, when a user inputs a load setting number, the associated load weight and center-of-gravity position can be read.

The center-of-gravity-position calculation unit 14, the robot-image generating unit 15, the center-of-gravity-indication generating unit 16, and the image combining unit 17 are formed of the CPU 2 and the ROM 4.

The center-of-gravity display control unit 9 is activated when a user inputs a center-of-gravity displaying instruction via the teaching operation panel 10. Then, the center-of-gravity display control unit 9 displays an input screen, as shown in FIG. 3, on the display 10a of the teaching operation panel 10 to allow the user to input information, and reads the component weight and center-of-gravity position data from the non-volatile memory 6 constituting the specification setting unit 12.

The robot-image generating unit 15 is configured such that the center-of-gravity display control unit 9 causes the CPU 2 to generate a three-dimensional model image of the robot 11 by using a robot-image generating program stored in the ROM 4, on the basis of the input information about the angles of the respective shafts and the read lengths of link members of the components.

The center-of-gravity-position calculation unit 14 is configured such that the center-of-gravity display control unit 9 causes the CPU 2 to calculate the center-of-gravity position of the overall robot 11 by using a center-of-gravity calculation program stored in the ROM 4, on the basis of the read component weight and center-of-gravity position data, the input information about the angles of the respective shafts, etc.

Figure 5:
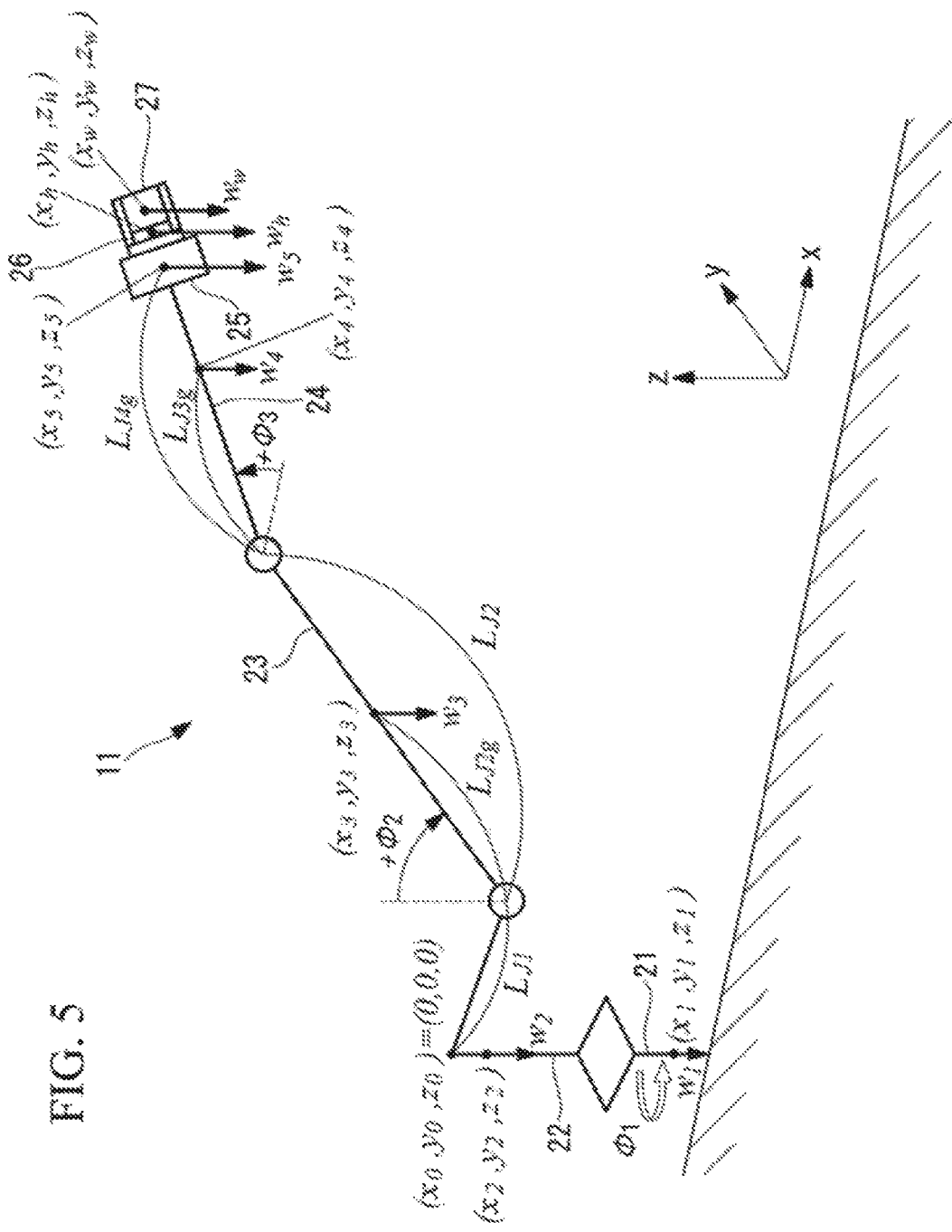
FIG. 5 is a schematic view of a robot for explaining an example center-of-gravity calculation method employed by a center-of-gravity-position calculation unit of the center-of-gravity display device in FIG. 1.

An example center-of-gravity position calculation method employed by the center-of-gravity-position calculation unit 14 will be described with reference to Expression 1 and FIG. 5, by taking a three-axis robot 11 having five units (components) 21, 22, 23, 24, and 25 and a hand 26 and a workpiece 27 attached at the leading end as an example. The center-of-gravity position of the overall robot 11 can be calculated using Expression 1.

$$x_g = \left(\sum_{i=m}^{n} w_i x_i + w_h x_h + w_w x_w\right) / \left(\sum_{i=m}^{n} w_i + w_h + w_w\right) \quad \{\text{Expression 1}\}$$

($m \leq n$ $m$ and $n$ are natural numbers)

$$y_g = \left(\sum_{i=m}^{n} w_i y_i + w_h y_h + w_w y_w\right) / \left(\sum_{i=m}^{n} w_i + w_h + w_w\right)$$

($m \leq n$ $m$ and $n$ are natural numbers)

$$z_g = \left(\sum_{i=m}^{n} w_i z_i + w_h z_h + w_w z_w\right) / \left(\sum_{i=m}^{n} w_i + w_h + w_w\right)$$

($m \leq n$ $m$ and $n$ are natural numbers)

In Expression 1,
$w_n$: the weight of the n-th unit,
$w_h$: the weight of the hand 26,
$w_w$: the weight of the workpiece 27,
$x_g$: the x coordinate of the center-of-gravity position of the overall robot 11, based on the x coordinate, $x_0$, of the origin of the robot 11,
$y_g$: the y coordinate of the center-of-gravity position of the overall robot 11, based on the y coordinate, $y_0$, of the origin of the robot 11,
$z_g$: the z coordinate of the center-of-gravity position of the overall robot 11, based on the z coordinate, $z_0$, of the origin of the robot 11,
$x_n$: the x coordinate of the center-of-gravity position of the n-th unit, based on the x coordinate, $x_0$, of the origin of the robot 11,
$y_n$: the y coordinate of the center-of-gravity position of the n-th unit, based on the y coordinate, $y_0$, of the origin of the robot 11,
$z_n$: the z coordinate of the center-of-gravity position of the n-th unit, based on the z coordinate, $z_0$, of the origin of the robot 11,
$x_h$: the x coordinate of the center-of-gravity position of the hand 26, based on the x coordinate, $x_0$, of the origin of the robot 11,
$y_h$: the y coordinate of the center-of-gravity position of the hand 26, based on the y coordinate, $y_0$, of the origin of the robot 11,
$z_h$: the z coordinate of the center-of-gravity position of the hand 26, based on the z coordinate, $z_0$, of the origin of the robot 11,
$x_w$: the x coordinate of the center-of-gravity position of the workpiece 27, based on the x coordinate, $x_0$, of the origin of the robot 11,
$y_w$: the y coordinate of the center-of-gravity position of the workpiece 27, based on the y coordinate, $y_0$, of the origin of the robot 11, and
$z_w$: the z coordinate of the center-of-gravity position of the workpiece 27, based on the z coordinate, $z_0$, of the origin of the robot 11.

Furthermore, because the first unit 21 is fixed to the ground, and the center-of-gravity position thereof does not change, the coordinates $(x_1, y_1, z_1)$ of the center-of-gravity position of the first unit 21 based on the origin $(x_0, y_0, z_0)$ of the robot 11 are expressed as:

$$x_1 = L1gx;$$

$$y_1 = L1gy; \text{ and}$$

$$z_1 = L1gz,$$

by using the x, y, and z components (L1gx, L1gy, and L1gz) of the distance based on the origin of the robot 11.

The second unit 22 is rotated by the first unit 21 about the vertical axis, at a rotation angle $\varphi_1$. Hence, the coordinates $(x_2, y_2, z_2)$ of the center-of-gravity position of the second unit 22 based on the origin $(x_0, y_0, z_0)$ of the robot 11 are expressed as:

$$x_2 = L2gx \cos \varphi_1;$$

$$y_2 = L2gy \sin \varphi_1; \text{ and}$$

$$z_2 = L2gz,$$

by using the x, y, and z components (L2gx, L2gy, and L2gz) of the distance based on the origin of the robot 11.

The coordinates of the center-of-gravity positions of the third, fourth, and fifth units 23, 24, and 25 are:

$$x_3 = (L_{J1} + L_{J2g} \sin \varphi_2) \cos \varphi_1;$$

$$y_3 = (L_{J1} + L_{J2g} \sin \varphi_2) \sin \varphi_1;$$

$$z_3 = L_{j2g} \cos \varphi_2;$$

$$x_4 = (L_{J1} + L_{J2} \sin \varphi_2 + L_{J3g} \cos \varphi_3) \cos \varphi_1;$$

$$y_4 = (L_{J1} + L_{J2} \sin \varphi_2 + L_{J3g} \cos \varphi_3) \sin \varphi_1;$$

$$z_4 = L_{J2} \cos \varphi_2 + L_{J3g} \sin \varphi_3;$$

$$x_5 = (L_{J1} + L_{J2} \sin \varphi_2 + L_{J4g} \cos \varphi_3) \cos \varphi_1;$$

$$y_5 = (L_{J1} + L_{J2} \sin \varphi_2 + L_{J4g} \cos \varphi_3) \sin \varphi_1; \text{ and}$$

$$z_5 = L_{J2} \cos \varphi_2 + L_{J4g} \sin \varphi_3.$$

Herein, $L_{J1}$: the offset between the center of rotation of the first unit 21 and the center of rotation of the second unit 22;

$L_{J2}$: the length of a link that is swung in the vertical direction by the second unit 22;

$L_{J2g}$: the distance between the center of rotation of the second unit 22 and the center-of-gravity position of the second unit 22;

$L_{J3g}$: the distance between the center of rotation of the third unit 23 and the center-of-gravity position of the third unit 23;

$L_{J4g}$: the distance between the center of rotation of the third unit 23 and the center-of-gravity position of the fourth (wrist) unit 24;

$\varphi_2$: the rotation angle of the second unit 22 about the horizontal axis; and $\varphi_3$: the rotation angle of the third unit 23 about the horizontal axis.

The coordinates of the center-of-gravity position of the overall robot 11 can be calculated with Expression 1 by assuming that n=1 and m=5, and the coordinates of the center-of-gravity position of the second unit 22 alone can be calculated with Expression 1 by assuming that n=m=2. Furthermore, the coordinates of the center-of-gravity position of a complex unit composed of the second and third units 22 and 23 can be calculated with Expression 1 by assuming that n=2 and m=3.

The center-of-gravity-position calculation unit 14 calculates and displays the center-of-gravity position on the display 10a when, for example, information about the angles of the respective shafts and the load setting numbers are input in the input screen in FIG. 3, and then a conversion arrow is designated. As shown in FIG. 3, a reverse-conversion arrow may be provided. With this configuration, by designating the reverse-conversion arrow after inputting the load setting numbers and the center-of-gravity position, the position information of the respective shafts may be obtained by reverse conversion.

The center-of-gravity-indication generating unit 16 is configured such that the center-of-gravity display control unit 9 causes the CPU 2 to generate a center-of-gravity indication image in which, for example, a preliminarily stored image of a sphere or the like is disposed at the center-of-gravity position of the overall robot 11 that has been calculated by the center-of-gravity-position calculation unit 14.

The image combining unit 17 is configured such that the center-of-gravity display control unit 9 causes the CPU 2 to combine the three-dimensional model image of the robot 11 that has been generated by the robot-image generating unit 15 and the center-of-gravity indication image that has been generated by the center-of-gravity-indication generating unit 16 and disposed at the center-of-gravity position of the overall robot 11 to generate a combined image.

Figure 6:
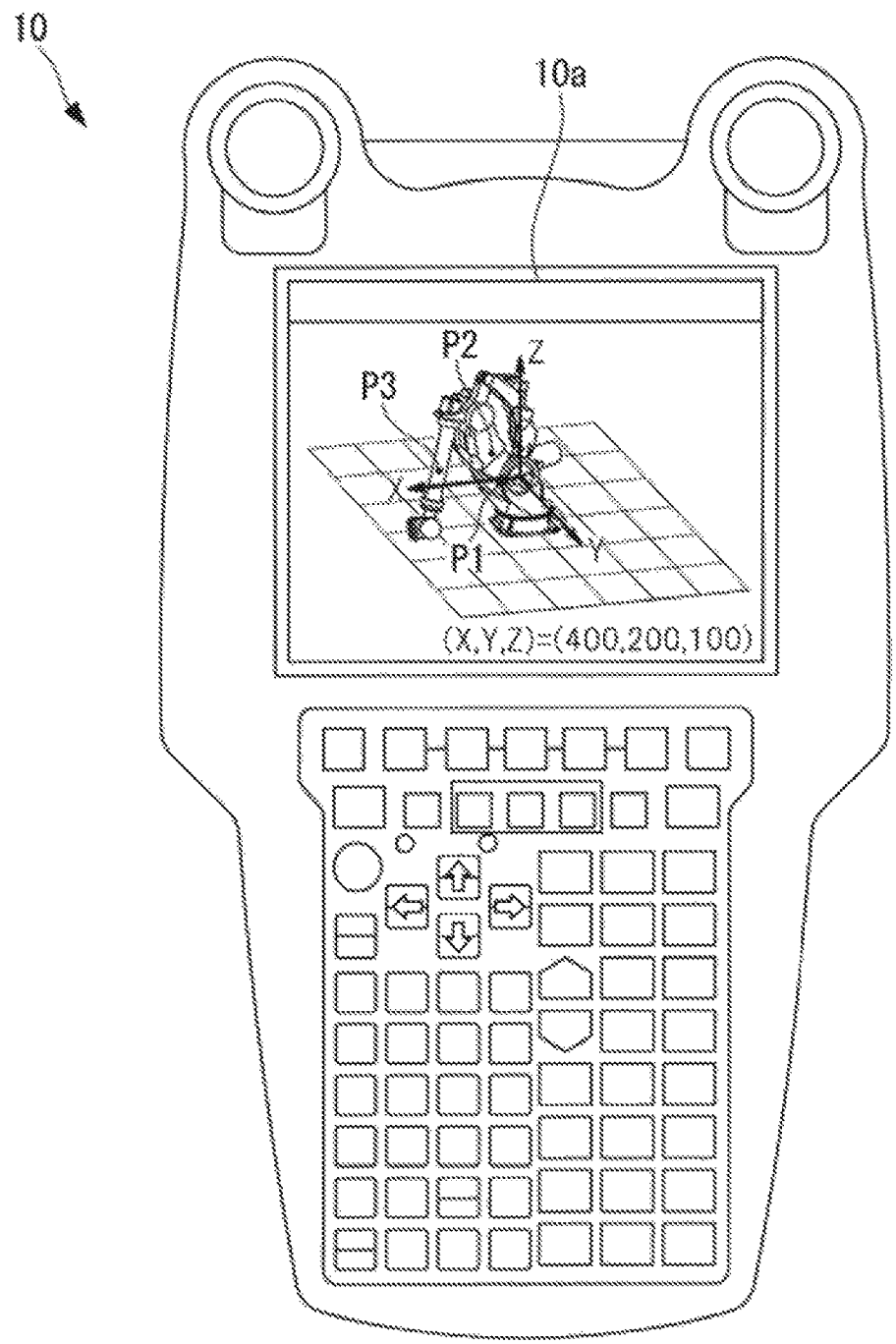
FIG. 6 is a diagram showing an example image generated by an image combining unit of the center-of-gravity display device and displayed on the display unit in FIG. 1.

Then, the combined image generated by the CPU 2 is sent to the teaching operation panel 10, via the teaching-operation-panel interface 7, by the center-of-gravity display control unit 9 and is displayed on the display 10a of the teaching operation panel 10, as shown in FIG. 6.

According to the thus-configured robot center-of-gravity display device 1 according to this embodiment, a user can, simply by inputting information about the angles of the respective shafts with which a posture of the robot 11 about which he/she wants to check the center-of-gravity position is achieved and then selecting a load, easily and intuitively check an image in which an indication showing the center of gravity is superimposed on a three-dimensional model image of the robot 11 that assumes that posture, on the display 10a. Accordingly, it is possible to determine the center-of-gravity position of the robot 11 when the robot 11 is transported or when construction of a robot system is considered, leading to an advantage in that it is possible to prevent the robot 11 from falling over etc.

Furthermore, as described above, by inputting the installation angle of the robot 11, even when the robot 11 is installed in an inclined manner, it is possible to calculate the center-of-gravity position by taking the installation angle into account.

Note that, in this embodiment, although an example case where the specification setting unit 12 is formed of the non-volatile memory 6 has been described, the user may input information from the teaching operation panel 10.

Furthermore, although the posture setting unit 13 allows the user to input information from the teaching operation panel 10, instead of this, information about the angles of the respective shafts in the respective steps of the robot operating program designated by the user may be read and then configured in a chronological order.

More specifically, every time the information about the angles of the respective shafts in each step is read from the robot operating program, a three-dimensional model image of the robot 11 is generated by the robot-image generating unit 15, the center-of-gravity position of the overall robot 11 is calculated by the center-of-gravity-position calculation unit 14, an indication of the center of gravity is generated by the center-of-gravity-indication generating unit 16, and images are combined by the image combining unit 17 and displayed on the display unit 18. As a result, the three-dimensional model image of the robot 11 moves like a frame-by-frame image or video, and the center-of-gravity position in each posture also moves with the movement of the three-dimensional model image. Thus, there is an advantage in that the user can easily and intuitively determine changes of the center-of-gravity position during the operation of the robot 11.

In this embodiment, although the center-of-gravity-indication generating unit 16 generates a spherical indication showing the center of gravity at the center-of-gravity position, the shape of the indication is not limited to spherical, but may be any shape. Furthermore, in addition to the spherical or other indication of the center of gravity, as shown in FIG. 6, the coordinate values of the center of gravity may be indicated by text. By doing so, a user can more accurately check the position of the center of gravity.

In this embodiment, although the center of gravity of the overall robot 11 is displayed, in addition to this, as shown in, for example, FIG. 6, center-of-gravity positions P1, P2, and P3 of the units 21, 22, 23, 24, and 25 of the respective shafts may be displayed.

Figure 7:
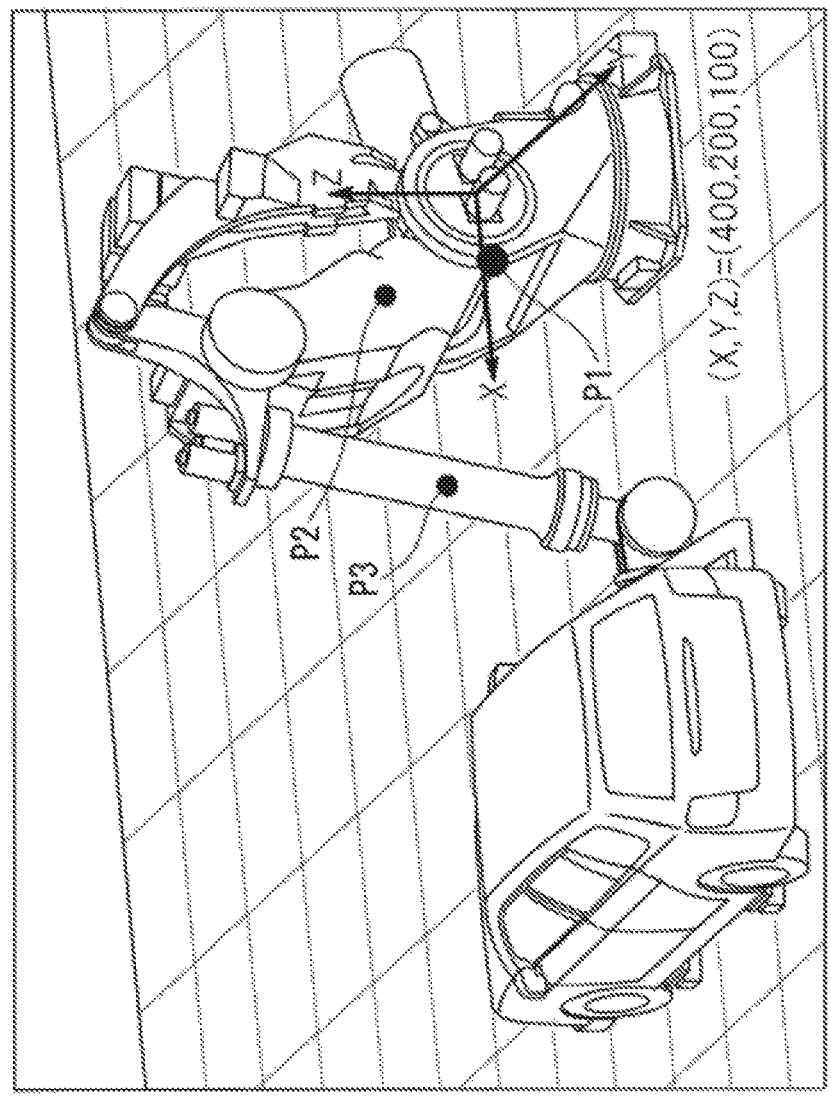
FIG. 7 is a diagram showing an example indication of the center-of-gravity position in a robot simulation device.

In this embodiment, although a case where the robot control device 100 is provided with the center-of-gravity display device 1 has been described, instead of this, the center-of-gravity display device 1 may be provided in a simulation device that is not connected to the robot 11. By doing so, as shown in FIG. 7, the present invention can be used in a case where the center-of-gravity positions P1, P2, and P3 in the respective postures of the robot 11 are simulated, when a large load (for example, a car or a hand for handling the car) or the like that is difficult to prepare is assumed.

As a result, the above-described embodiment leads to the following aspects.

An aspect of the present invention provides a robot center-of-gravity display device including: a specification setting unit that sets the specifications including, at least, the weights, center-of-gravity positions, and dimensions of components of respective shafts of a robot; a posture setting unit that sets position information of the respective shafts of the robot; a robot-image generating unit that generates a three-dimensional model image of the robot in a state in which the respective shafts thereof are located at the positions indicated by the position information on the basis of the position information of the respective shafts of the robot set by the posture setting unit and the specifications of the components set by the specification setting unit; a center-of-gravity-position calculation unit that calculates the center-of-gravity position of the overall robot on the basis of the position information of the respective shafts of the robot set by the posture setting unit and the specifications of the components set by the specification setting unit; an image combining unit that superimposes an indication showing the center of gravity of the overall robot on the three-dimensional model image generated by the robot-image generating unit, at the center-of-gravity position calculated by the center-of-gravity-position calculation unit; and a display unit that displays the image generated by the image combining unit.

According to this aspect, once the specification setting unit sets the specifications including the weights, center-of-gravity positions, and dimensions of the components of the robot, and the posture setting unit sets the position information of the respective shafts of the robot, the robot-image generating unit generates a three-dimensional model image of the robot in a state in which the respective shafts thereof are located at the positions indicated by the position information. Then, the center-of-gravity-position calculation unit calculates the center-of-gravity position of the overall robot on the basis of the position information of the respective shafts of the robot and the specifications of the components, and the image combining unit generates an image in which an indication showing the center of gravity of the overall robot is superimposed on the generated three-dimensional image of the robot, at the center-of-gravity position. Then, this image is displayed on the display unit. With this configuration, regardless of the posture of the robot, the user can easily and intuitively determine the center-of-gravity position of the robot through the image displayed on the display unit.

In the above aspect, the indication showing the center of gravity may include coordinate values showing the center-of-gravity position of the overall robot.

With this configuration, by displaying the coordinate values showing the center-of-gravity position of the overall robot, the user can more clearly determine the center-of-gravity position of the robot.

Furthermore, in the above aspect, the center-of-gravity-position calculation unit may calculate the center-of-gravity positions of the respective components, and the image combining unit may superimpose indications showing the centers of gravity of the respective components on the three-dimensional model image, at the center-of-gravity positions of the respective components.

With this configuration, the user can easily and intuitively determine the center-of-gravity positions of the respective components, in addition to the center-of-gravity position of the overall robot.

Furthermore, in the above aspect, the components may include a load attached to the leading end of the robot.

With this configuration, the load attached to the leading end of the robot is treated as a part of the components of the robot, thus enabling the user to easily determine the center-of-gravity position of the overall robot including the load.

Furthermore, in the above aspect, the posture setting unit may read multiple sets of position information of the respective shafts of the robot recorded in an operation program of the robot and may configure the position information in a chronological order.

With this configuration, when the respective shafts of the robot move so as to assume a plurality of postures in a chronological order in accordance with the operation program of the robot, as a result of the posture setting unit setting position information of the respective shafts at different times, the robot-image generating unit generates three-dimensional model images of the robot at these times, the center-of-gravity-position calculation unit calculates the center-of-gravity positions of the overall robot at these times, and images in which an indication of the center of gravity is superimposed on the three-dimensional model image are generated.

As a result, by displaying the thus-generated plurality of images so as to be switched from one to another in a chronological order, the three-dimensional model image of the robot moves like a frame-by-frame image or video, and the center-of-gravity position in each posture also moves with the movement of the three-dimensional model image. With this configuration, the user can easily and intuitively determine changes of the center-of-gravity position during the operation of the robot.

Furthermore, in the above aspect, the position information of the respective shafts of the robot may include the installation angle of the robot.

With this configuration, even if the robot is installed in an inclined manner, it is possible to calculate the center-of-gravity position, taking the installation angle into account.

Another aspect of the present invention provides a robot control device including any one of the above-described robot center-of-gravity display devices.

Another aspect of the present invention provides a robot simulation device including any one of the above-described robot center-of-gravity display devices.

The present invention provides an advantage in that it enables a user of a robot to easily determine the center-of-gravity position of the robot.

REFERENCE SIGNS LIST 1 center-of-gravity display device
2 CPU (center-of-gravity-position calculation unit, robot-image generating unit, center-of-gravity-indication generating unit, and image combining unit)
4 ROM (center-of-gravity-position calculation unit, robot-image generating unit, center-of-gravity-indication generating unit, and image combining unit)
6 non-volatile memory (specification setting unit)
10 teaching operation panel (posture setting unit)
11 robot
12 specification setting unit
13 posture setting unit
14 center-of-gravity-position calculation unit
15 robot-image generating unit
17 image combining unit
18 display unit
21, 22, 23, 24, and 25 unit (component)
26 hand (component)
27 workpiece (component and load)
100 robot control device

The invention claimed is:

1. A robot center-of-gravity display device comprising:
a specification setting unit that stores specifications set in advance, the specifications including, at least, the weights, center-of-gravity positions, and dimensions of components of respective shafts of a robot;
a posture setting unit in which position information of the respective shafts of the robot is set on a basis of designation by a user;
a robot-image generating unit that generates a three-dimensional model image of the robot in a state in which the respective shafts thereof are located at the positions indicated by the position information based on the position information of the respective shafts of the robot set by the posture setting unit and the specifications of the components of the respective shafts of the robot set by the specification setting unit;
a center-of-gravity-position calculation unit that calculates the center-of-gravity position of the overall robot based on the position information of the respective shafts of the robot set by the posture setting unit and the specifications of the components of the respective shafts of the robot set by the specification setting unit;
an image combining unit that superimposes an indication showing the center of gravity of the overall robot on the three-dimensional model image generated by the robot-image generating unit, at the center-of-gravity position calculated by the center-of-gravity-position calculation unit; and
a display unit that displays the image generated by the image combining unit.

2. The robot center-of-gravity display device according to claim 1, wherein the indication showing the center of gravity includes coordinate values showing the center-of-gravity position of the overall robot.

3. The robot center-of-gravity display device according to claim 1, wherein
the center-of-gravity-position calculation unit calculates the center-of-gravity positions of the components of the respective shafts of the robot, and
the image combining unit superimposes indications showing the centers of gravity of the components of the respective shafts of the robot on the three-dimensional model image, at the center-of-gravity positions of the components of the respective shafts of the root.

4. The robot center-of-gravity display device according to claim 1, wherein the components include a load attached to a leading end of the robot.

5. The robot center-of-gravity display device according to claim 1, wherein the posture setting unit reads multiple sets of position information of the respective shafts of the robot recorded in an operating program of the robot and configures the position information in a chronological order.

6. The robot center-of-gravity display device according to claim 1, wherein the position information of the respective shafts of the robot includes the installation angle of the robot.

* * * * *